(12) United States Patent
Nettleton et al.

(10) Patent No.: US 8,125,642 B2
(45) Date of Patent: Feb. 28, 2012

(54) PROCESS TO OPTICALLY ALIGN A PHOTORECEIVER WITH A LASER TRANSMITTER SOURCE IN A LASER RANGEFINDER SYSTEM

(75) Inventors: John E. Nettleton, Fairfax Station, VA (US); Dallas N. Barr, Woodbridge, VA (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 344 days.

(21) Appl. No.: 12/552,598

(22) Filed: Sep. 2, 2009

(65) Prior Publication Data

US 2011/0051138 A1 Mar. 3, 2011

(51) Int. Cl.
*G01B 11/00* (2006.01)

(52) U.S. Cl. .......................... 356/400; 356/399; 356/401

(58) Field of Classification Search .......... 356/399–401, 356/614, 445
See application file for complete search history.

(56) References Cited

U.S. PATENT DOCUMENTS

| | | | | |
|---|---|---|---|---|
| 6,487,334 | B2 * | 11/2002 | Ducellier et al. | 385/22 |
| 6,549,692 | B1 * | 4/2003 | Harel et al. | 385/18 |
| 6,807,334 | B2 * | 10/2004 | Schroeder et al. | 385/18 |
| 7,277,173 | B1 * | 10/2007 | Bock et al. | 356/399 |
| 2003/0210852 | A1 * | 11/2003 | Chen et al. | 385/18 |

* cited by examiner

*Primary Examiner* — Tarifur Chowdhury
*Assistant Examiner* — Isiaka Akanbi
(74) *Attorney, Agent, or Firm* — Richard J. Kim

(57) ABSTRACT

A process for optically aligning a laser rangefinder that includes the steps of providing a laser rangefinder having a laser source, a photodetector lens and a photodetector, providing a fiber optic travel path, aligning the laser source to the fiber optic travel path, illuminating the photodetector with a light source, focusing the photodetector lens, coupling the fiber optic travel path to an optical light source, and aligning the fiber optic light relative to the photodetector.

1 Claim, 6 Drawing Sheets

PROCESS TO OPTICALLY ALIGN A PHOTORECEIVER WITH A LASER TRANSMITTER SOURCE IN A LASER RANGEFINDER SYSTEM

GOVERNMENT INTEREST

The invention described herein may be manufactured, used, sold and/or licensed by or for the United States Government.

FIELD OF THE INVENTION

The invention relates to a process for aligning a laser source with a photoreceiver in a laser rangefinder.

BACKGROUND OF THE INVENTION

Laser rangefinders are generally known in the art and may be utilized to determine the range of an object at varying distances. Laser rangefinders generally include a laser which transmits a pulse of energy toward a target. The laser energy is reflected by the target and detected by the rangefinder to calculate a distance or range to the target.

Laser rangefinders are precise instruments that require calibration and alignment to ensure an accurate detected distance. Various processes have been suggested for testing laser rangefinder systems. For example, it is known in the art to provide a range simulator or a simulated object in front of a laser rangefinder. The simulated object provides a pulse that is received by the rangefinder to simulate an object at a varying distance. A calculation of the return signal delay time may be utilized to determine the accuracy of the distance to a simulated target.

Additionally, the pulses from the target may be linked with a detector such that an operator may attempt to align or calibrate the laser rangefinder by moving the detector such that a pulse source is peaked or optimized. An operator may then attenuate the simulated transmitter source and attempt to focus to determine a best position or focusing spot associated with a photoreceiver. These varying steps may be performed over and over until an operator feels he has successfully aligned and focused a laser rangefinder.

However, the alignment and focusing is performed using an electronic signal that may be inaccurate due to various electrical connections and returns associated with the pulse signals. Additionally, such a calibration system may erroneously align various components due to the faulty signals mentioned previously. Further, such a process requires a hunt and search technique that is effort and labor intensive. The quality of an alignment and focusing utilizing such a system with large variations may result in laser rangefinder systems having varying performance characteristics.

There is therefore a need in the art for a process to optically align a photoreceiver with a laser transmitter source to provide a well aligned return on a photoreceiver as well as a focused return on the photoreceiver. There is also a need in the art for a process that reduces the labor and effort involved in alignment and focusing of a laser rangefinder that assures an accurate and repeatable alignment of multiple laser rangefinder systems.

SUMMARY OF THE INVENTION

In one aspect, there is disclosed a process for optically aligning a laser rangefinder that includes the steps of providing a laser rangefinder having a laser source, a photodetector lens and a photodetector, providing a fiber optic travel path, aligning the laser source to the fiber optic travel path, illuminating the photodetector with a light source, focusing the photodetector lens, coupling the fiber optic travel path to an optical light source, and aligning the fiber optic light relative to the photodetector.

In another aspect of the invention, there is provided a process for optically aligning a laser rangefinder that may include the steps of providing a laser rangefinder having a laser source, a photodetector lens and a photodetector, providing a fiber optic travel path, providing a mirror simulating a far field position and transmitting a laser beam from the laser source at the mirror into the fiber optic travel path, providing a camera, monitor and wavelength filter to view the photodetector and provide a light source at a desired wavelength to the camera, aligning the laser source to the fiber optic travel path, illuminating the photodetector with a light source, focusing the photodetector lens at a wavelength corresponding to the wavelength of the laser source, coupling the fiber optic travel path to an optical light source, and aligning the fiber optic light relative to the photodetector.

DETAILED DESCRIPTION OF THE PREFERRED EMBODIMENT

Figure 1:
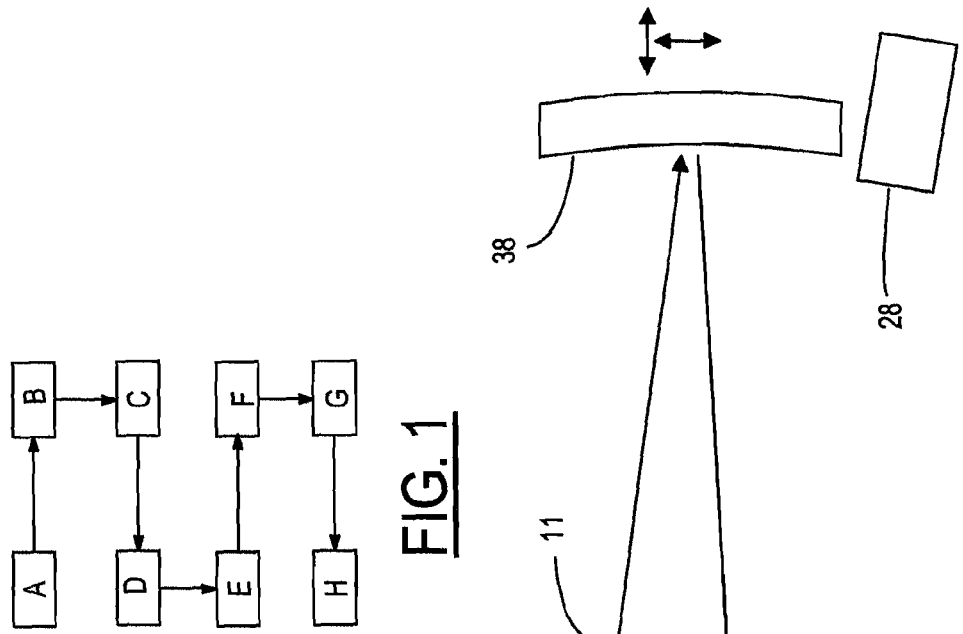
FIG. 1 is a block diagram of one embodiment of the process.
Figure 2A:
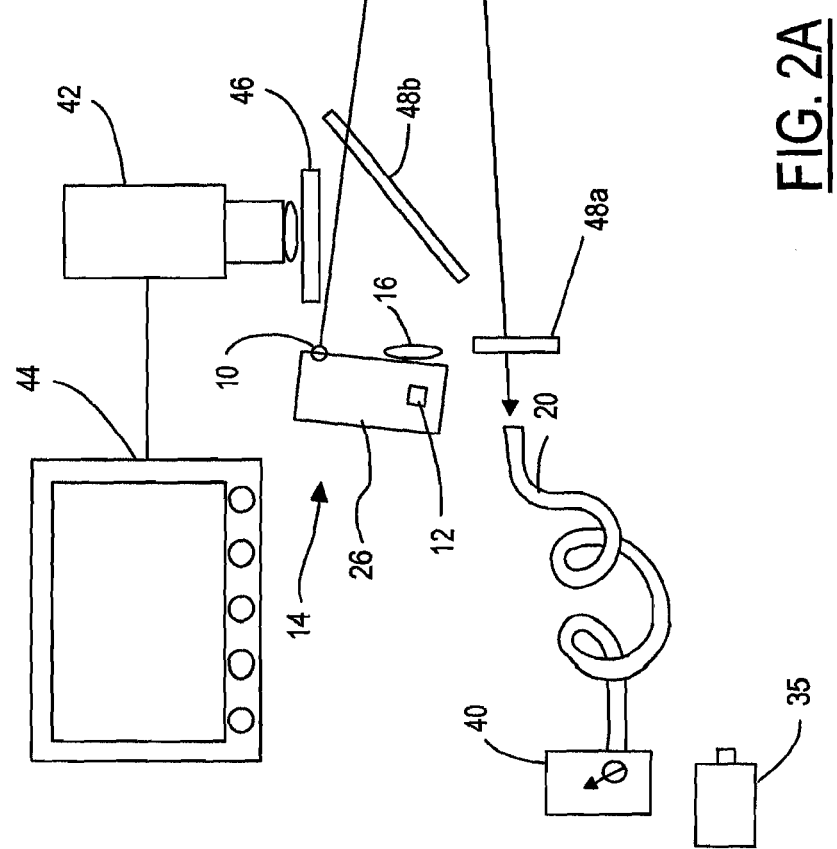
FIG. 2A is a graphical depiction of the step of aligning a laser source with a fiber optic travel path using a measurement device.
Figure 2B:
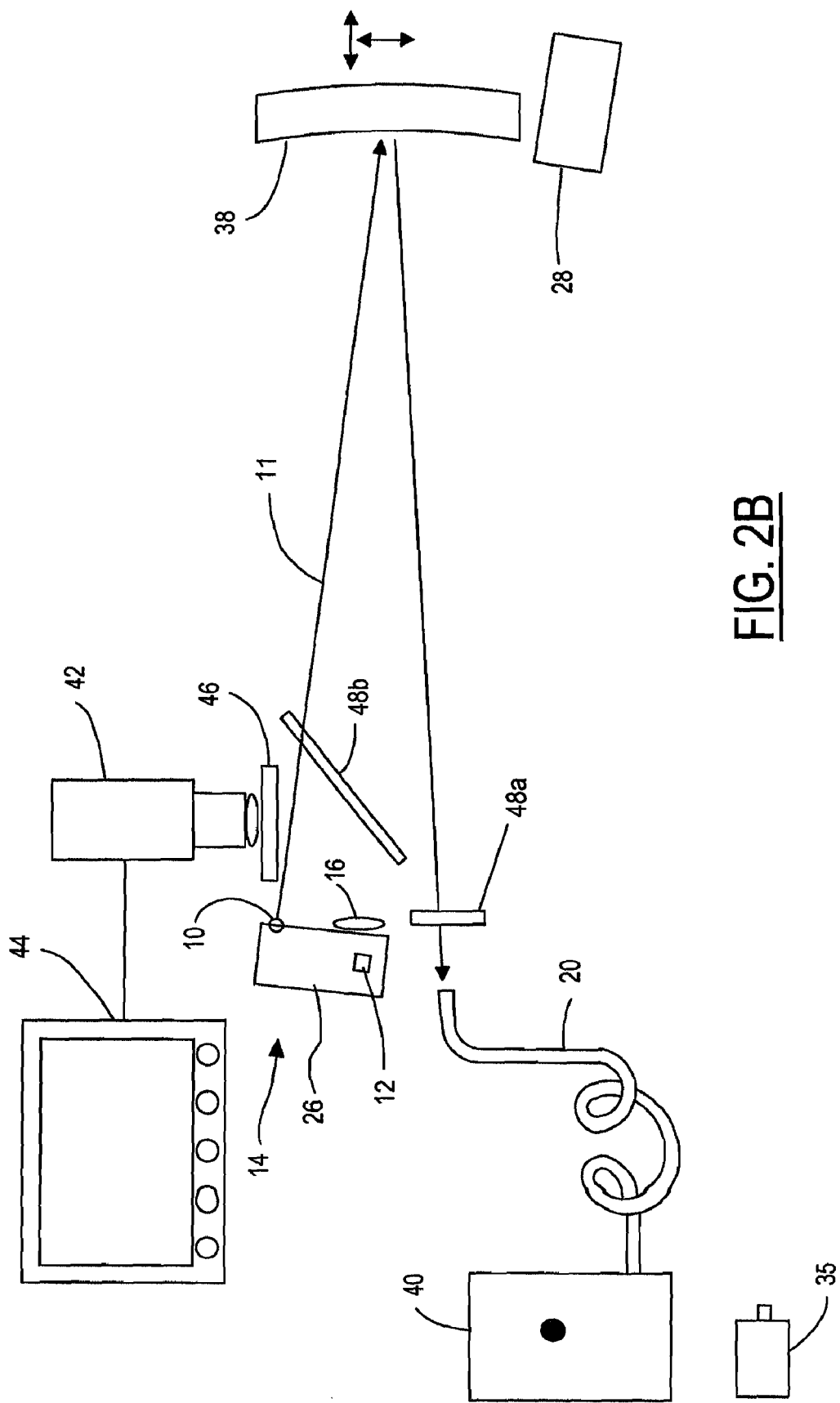
FIG. 2B is a graphical depiction of the step of aligning a laser source with a fiber optic travel path using a visual cue.
Figure 2C:
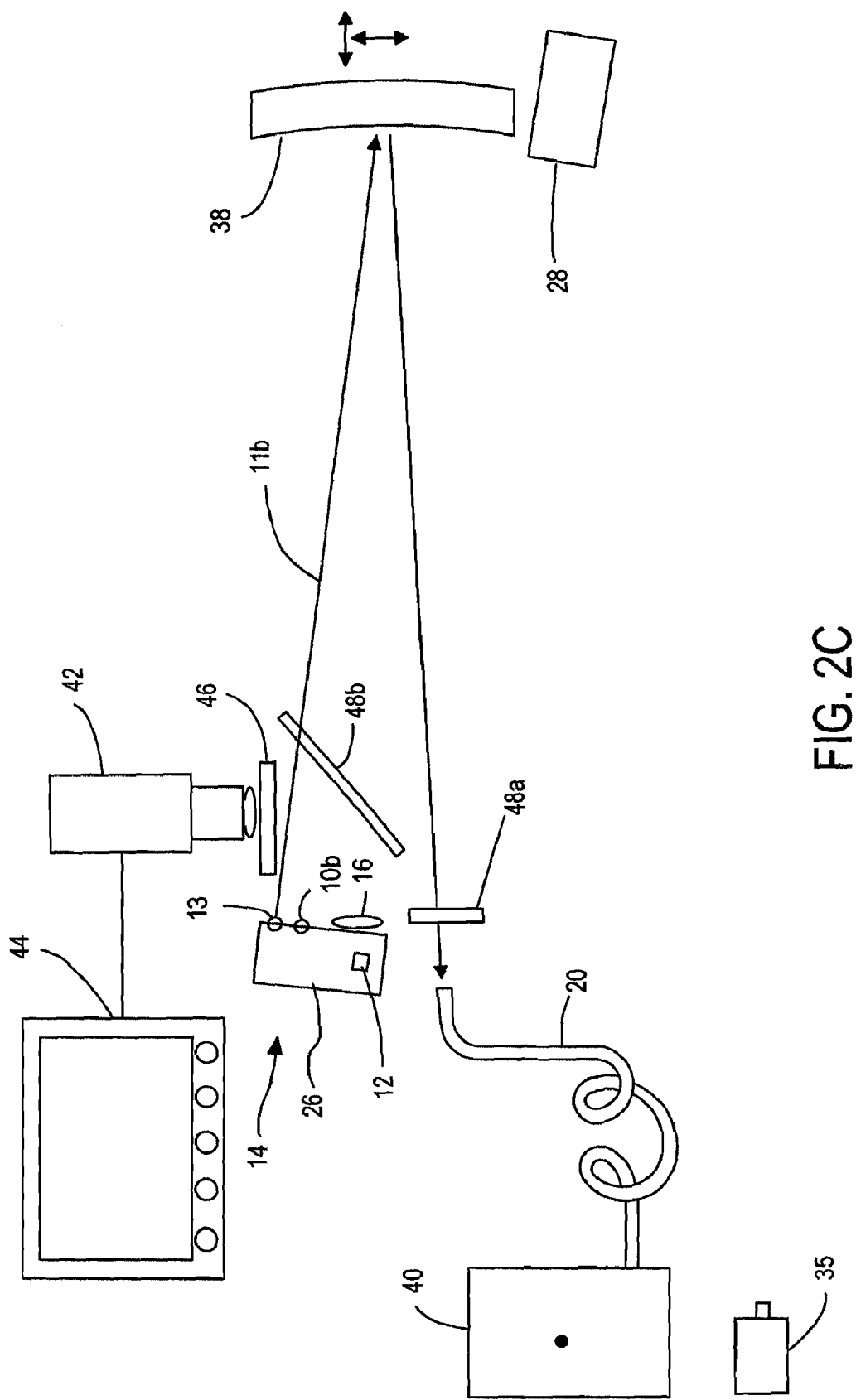
FIG. 2C is a graphical depiction of the step of aligning a laser source with a fiber optic travel path using an alternative laser source.
Figure 3:
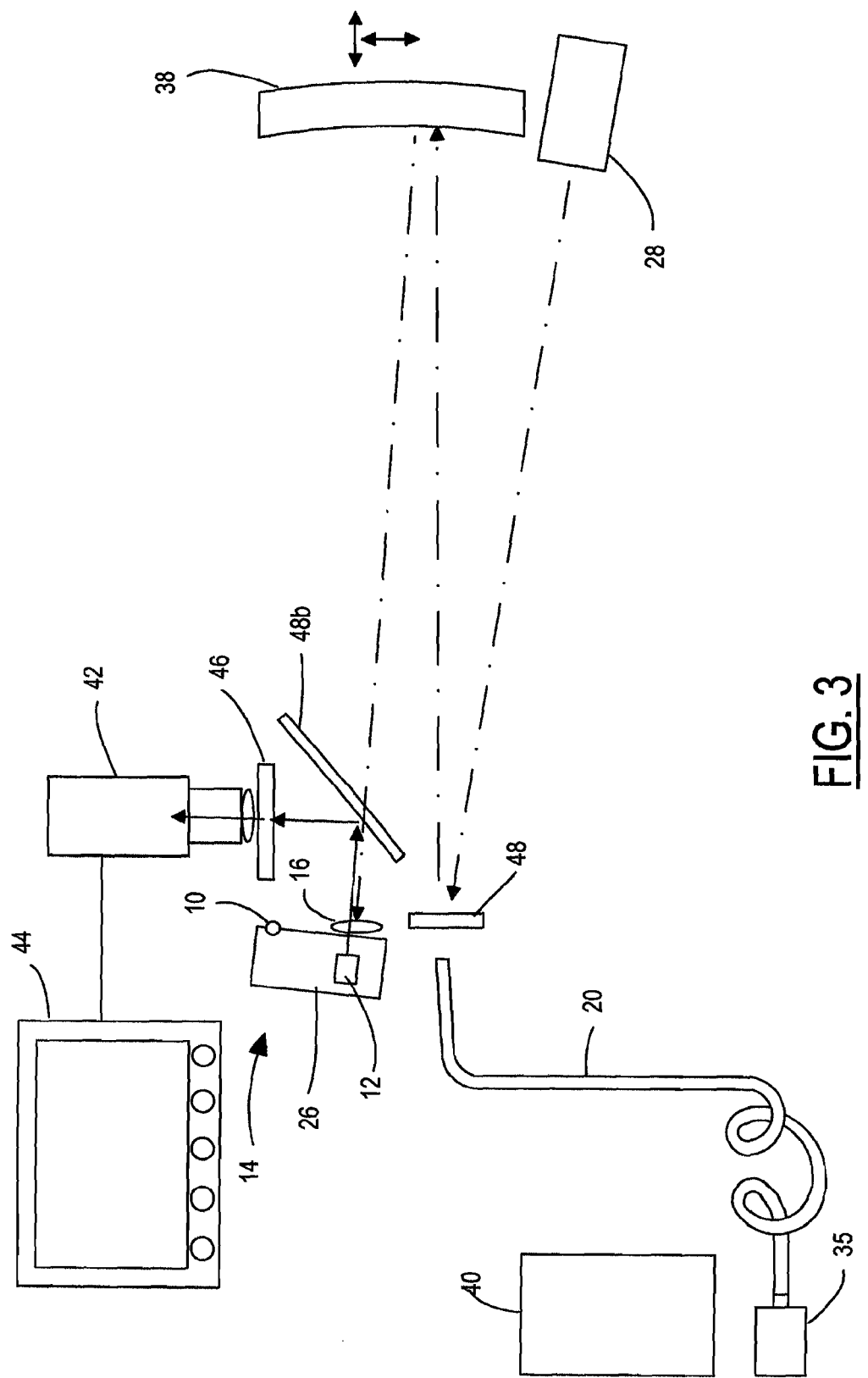
FIG. 3 is a graphical depiction of the step of focusing the photodetector lens.
Figure 4:
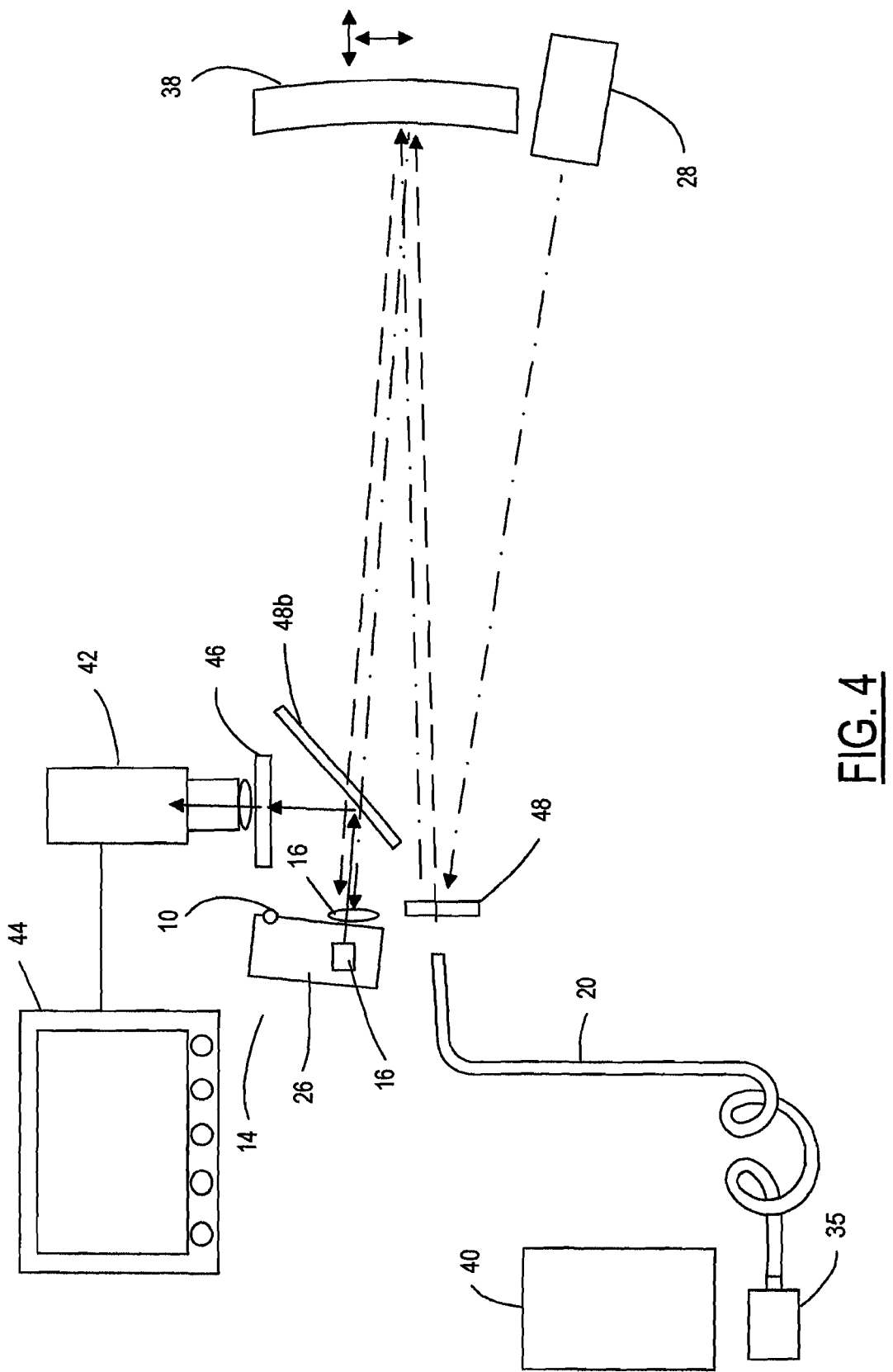
FIG. 4 is a graphical depiction of the step of aligning a fiber optic light source on a photodetector.

Referring to FIGS. 1 through 4, there are shown a block diagram and graphical depictions outlining the steps of one embodiment of a process for optically aligning a laser source 10 that produces a laser beam 11 with a photodetector 12 in a laser rangefinder 14. As can be seen in FIG. 1, the process may include the step A of providing a laser rangefinder 14 that includes a laser source 10, a photodetector lens 16, and a photodetector 12, as shown in FIGS. 2-4. In one aspect, the laser source 10 may be an eyesafe laser source having a wavelength outside of the visible spectrum. In another aspect, the eyesafe laser may have a wavelength of approximately 1.5 microns.

The process for optically aligning the rangefinder may also include the step B of providing a fiber optic travel path 20, as shown in FIGS. 2A-C. In the next step C of the process, the laser source 10 is aligned with the fiber optic travel path 20, as shown in the graphical depiction of FIGS. 2A-C. A spherical mirror 38 may be adjusted, as represented by the vertical and horizontal arrows to align the laser source 10 with the travel path 20. The spherical mirror 38 may be positioned to simulate a far field position. In one aspect, the fiber optic travel path 20 may be aligned with the focal point of the mirror 38. When the laser beam 11 from the laser source 10 is transmitted through the fiber optic travel path 20, it may be detected by a detector 40a, as shown in FIG. 2A or it may be detected with a visual cue on a screen 40b, as shown in FIG. 2B to optimize the transmission of the laser beam 11 indicating an alignment of the laser source 10 with the fiber optic travel path 20.

In an alternative embodiment, as shown in FIG. 2C, a laser source 13 other than the laser source 10 may be utilized for operation of the laser rangefinder 14 such as a secondary or alternative laser source in a visible wavelength. In this aspect, the alternative laser source 13 may be transmitted at the mirror 38 and into the fiber optic travel path 20. The alternative laser source 13 may be projected onto a screen 40b and the visible laser 13 brightness may be optimized on the screen 40b to indicate an alignment of a laser source 10b with the fiber optic travel path 20. It should be realized that the optically visible laser source 13 may be boresighted or aligned with the eyesafe laser source 10b of the laser rangefinder 14.

The next step D includes illuminating the photodetector 12 of the laser rangefinder 14 with a light source 28, as shown in the graphical depiction of FIG. 3. In one aspect, a camera 42, monitor 44 and wavelength filter 46 are provided to allow for the optical viewing of the photodetector 12. The wavelength filter 46 provides a desired wave length to see on the monitor 44. The wavelength filter 46 may be chosen such that it corresponds to a wavelength of the laser source 10. In this manner, an operator may optically align a fiber optic light source 35 relative to the photodetector 12 at a same wavelength corresponding with the laser source 10. Additionally, a beam splitter 48b may also be provided for transmitting a portion of the light from the light source 28 to the camera 42. Illumination of the photodetector 12 with a light source 28 in combination with the camera 42, monitor 44, and wavelength filter 46 allow an operator to visually focus the photodetector lens 16 such that the photodetector 12 is clearly focused on the monitor 44 at the desired wavelength of the laser source 10. In one aspect, during the process of aligning the fiber optic light relative to the photodetector 12, the operator may move an illuminator reflector 48a that reflects the light source 28 toward the mirror 38 to adjust an axis of the light source so that is corresponds to the axis of the laser source 10. Additionally, the operator may also adjust a position of the mirror 38 to align the laser source 10 with the fiber optic travel path 20. Manipulation of both the mirror 38, as well as the reflector 48a, may be utilized to align the laser source 10 with the fiber optic travel path 20.

After the photodetector lens 16 has been focused in step E, the fiber optic travel path 20 may be coupled to an optical light source 35 in step F as shown in FIG. 4. The coupling of the optical light source 35 provides a spot or point of light 37 that may be visually aligned in step G with a center of the photodetector 12 displayed in the monitor 44.

Figure 5A:
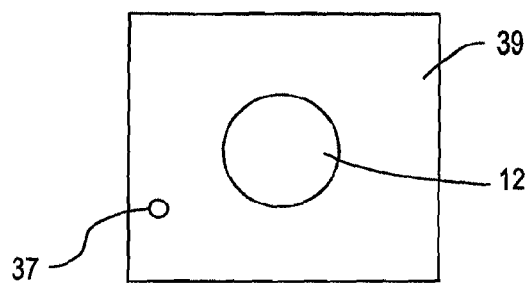
FIG. 5A is a graphical depiction of the fiber optic light source on an edge of the substrate.
Figure 5B:
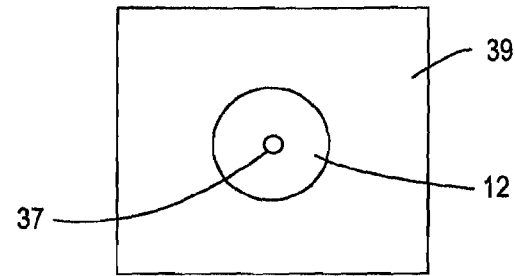
FIG. 5B is a graphical depiction of the fiber optic light source aligned on the photodetector.

Referring to FIG. 5A, there is shown a graphical depiction of the point of light 37 on a substrate material 39 to which the photodetector 12 is attached. An operator may align the point of light 37 from the substrate 39 to the photodetector 12 by moving the photodetector 12 until the fiber optic light 37 is centered on the photodetector 12, as shown in FIG. 5B. In one aspect, the substrate 39 and photodetector 12 materials are selected such that there is a visual contrast between the two materials. The visual contrast allows an operator to verify alignment of the point of light 37 on the photodetector 12. In this manner, there is visual feedback to an operator of an alignment of the fiber optic light representing a laser source that is centered on the photodetector 12.

After the alignment of the fiber optic light relative to the photodetector 12 in step G, the operator may readjust the focus of the photodetector lens 16 in step H to assure that the lens is focused after movement during the alignment step.

The process for optically aligning a laser rangefinder has improvements over prior art processes in that visual confirmation of the alignment and focusing of the laser rangefinder 14 is achieved through the use of a camera 42, monitor 44 and filter 46 that provides visual verification using a desired image corresponding to a wavelength of the laser source 10. Additionally, the process improves the quality of the alignment and focus by providing visual confirmation while reducing the time required to perform the alignment and focus of an eyesafe laser rangefinder's photodetector 12 with the laser transmitter source 10, and assure that false readings associated with prior process and systems are avoided.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A process for optically aligning an eyesafe laser rangefinder to achieve an accurate and repeatable alignment and focus of laser return for multiple laser rangefinder systems, said process including the steps of:
   providing a laser rangefinder having a laser source, a photodetector lens and a photodetector;
   providing a fiber optic travel path;
   providing a mirror simulating a far field position and transmitting a laser beam from the laser source at the mirror and into the fiber optic travel path;
   providing a camera, monitor and wavelength filter to view the photodetector and provide a light source at a desired wavelength to the camera;
   aligning the laser source to the fiber optic travel path;
   illuminating the photodetector with a light source;
   focusing the photodetector lens at a wavelength corresponding to the wavelength of the laser source;
   coupling the fiber optic travel path to an optical light source;
   aligning the fiber optic light relative to the photodetector to provide a well aligned and focused return on the photodetector of said laser rangefinder for an accurate and repeatable alignment and focus of laser return for multiple laser rangefinder systems.

* * * * *